(12) United States Patent
Falk (10) Patent No.: US 10,999,259 B2
(45) Date of Patent: *May 4, 2021

(54) SINGLE POINT OF CUSTODY SECURE DATA EXCHANGE (71) Applicant: ShortSave, Inc., Monument, CO (US)

(72) Inventor: Karl Matthew Falk, Monument, CO (US)

(73) Assignee: ShortSave, Inc., Monument, CO (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/673,681

(22) Filed: Nov. 4, 2019

(65) Prior Publication Data
US 2020/0067894 A1 Feb. 27, 2020

Related U.S. Application Data (63) Continuation of application No. 15/726,247, filed on Oct. 5, 2017, now Pat. No. 10,469,463.

(60) Provisional application No. 62/404,501, filed on Oct. 5, 2016.

(51) Int. Cl.
H04L 29/06 (2006.01)
G06F 21/60 (2013.01)
G06F 21/62 (2013.01)

(52) U.S. Cl.
CPC ........ H04L 63/0435 (2013.01); G06F 21/606 (2013.01); G06F 21/6209 (2013.01); H04L 63/0428 (2013.01); H04L 63/08 (2013.01)

(58) Field of Classification Search
CPC . H04L 63/0435; H04L 63/0428; H04L 63/08; G06F 21/6209; G06F 21/606
See application file for complete search history.

(56) References Cited

U.S. PATENT DOCUMENTS

| 7,484,245 | B1 | 1/2009 | Friedman et al. | |
| 7,526,795 | B2* | 4/2009 | Rollins | G06F 21/602 380/282 |
| 7,941,526 | B1* | 5/2011 | Hope | H04L 41/069 709/224 |
| 2005/0015608 | A1 | 1/2005 | Peterson | |
| 2010/0332479 | A1* | 12/2010 | Prahlad | G06F 16/1748 707/741 |
| 2015/0271146 | A1* | 9/2015 | Holyfield | G06F 21/606 713/171 |
| 2017/0201601 | A1* | 7/2017 | Bright | H04L 63/0807 |

* cited by examiner

Primary Examiner — Meng Li
(74) Attorney, Agent, or Firm — Stinson LLP (57) ABSTRACT A semi-complete secure data container is associated with a unique identifier by a requesting entity. The data container link/portal address, and a request to add data to the container, are combined into a message that is sent to a client. Upon receipt of the request, the client need not do anything to create a secure environment by which to protect the data. The secure environment, or data container, is already created and is merely awaiting data; data supplied by the client. Once the client places the requested data into the data container, the container closes. The data when added is a unidirectional one-way flow and cannot be accessed once added by the sending party. The container, now closed and containing the sending party's data, returns to the original requesting entity per the unique identifier.

13 Claims, 6 Drawing Sheets

SINGLE POINT OF CUSTODY SECURE DATA EXCHANGE

CROSS-REFERENCE TO RELATED APPLICATIONS

The present application is a continuation of U.S. patent application Ser. No. 15/726,247 filed Oct. 5, 2017, which relates to and claims the benefit of priority to U.S. Provisional Patent Application No. 62/404,501 filed Oct. 5, 2016, which are hereby incorporated by reference in their entirety for all purposes as if fully set forth herein.

BACKGROUND

Embodiments of the present invention relate, in general, to secure data transfer and more particularly to securely sending and receiving documents via the Internet using single point of custody Security has its costs. Security makes it difficult for consumers, especially those who are not technology savvy, to conduct business. Consumers find themselves fumbling and getting frustrated with businesses that require them to navigate through portal software or where a consumer has to create a pin or a password or set up an account or download an app to send or receive sensitive information.

Secure communication solutions for sensitive documentation from a consumer to a business include: 1) Deliver it in person, 2) Mail, 3) Fax/eFax, 4) Secure email and 5) Secure login/pw to a business portal, FTP transfer tools and several others.

Personal courier of sensitive documents and information is a time-tested means by which to exchange data but it is not without its risk. The data is not secure while in transit and the solution comes with significant delays. And if the wrong information/data is delivered the requesting person has to review and have the other party print new information and travel again to deliver the documentation in an unsecure fashion. While there are instances in which secure physical delivery of data makes sense, they are typically reserved for extreme situations.

Securing data transfer by mail relies on the ubiquitous nature of the mail system. Once delivered the odds of intercepting an envelope that conceals sensitive data is low. But it can and has happened making mail an unsecure means by which to exchange data.

A facsimile machine or fax encrypts document in transit between one machine to another. The sender must have a machine that direct dials to the other party. In this situation, the documentation in paper format is transmitted through a machine through an internet or phone connection. This option requires a machine or similar software that the sender must possess. There is a single point of custody but the sender must initiate the send, the receiver cannot initiate a request. This solution also travels over unsecured communication lines. The message is encrypted but the means by which it travels though is not encrypted. Many consumers and companies today do not have fax Machines anymore so the sender must use a third-party company like FedEx-Kinkos and the like to print the documents, hand them to a clerk behind a counter to fax to another fax machine. Again, there is no single point of custody.

One of the most convenient means of communicating and sharing information today is through electronic mail, but is it safe? Unfortunately, the answer is also no. Recent studies show that many financial industries and HR industries use unsecure email to acquire consumer data to obtain new hire applications, health benefits applications and bank routing information for employee pay, etc.

When an email leaves an emails providers server, it bounces around the internet passing through an undetermined number of servers before landing at its intended destination. It is impossible to know who has access to each of those servers. What about encrypted email? This is no doubt encrypted email offers a higher level of security but with such security comes problems . . . the email must be encrypted before it leaves the senders computer and it must remain encrypted all the way to its recipient. Most encryption techniques require the recipient to authenticate themselves, download software, and then create a password to access an email. While seemingly simple, these tasks are enough to dissuade consumers from either protecting their data or participating in a data exchange entirely.

FTP transfer sites are equally confusing and time consuming. These sites are portal access and login access websites that allows two parties to share large files. This requires the receiver to set up account access for the sender and the sender accessing the portal and subsequently setting up an account that they must log into and upload and or receive data and documents. This solution is very challenging because over time you must purge documents and accounts because over time they become a risk to sitting data. These sites and services also are not always secure or encrypted but just allow two parties to exchange large amounts of data.

Document exchange though a cloud storage tool (like Dropbox, Google Drive, box etc.) is yet another way to transfer documents. These tools are typically used long term storage of documents, where one person or entity can store documents and data in a folder that is backed up to the cloud, and anyone that has shared access to that folder can access it. This solution is great for backups and ensuring survivability of documents in case a computer is destroyed or lost. This solution has the ability to transport documents by sending a request for a document but cannot be initiated by a requester. Rather it has to be initiated by the sender, and both parties must have an account to the same storage service/company. These solutions also create residual copies of documents depending on how many times the folder is shared with other people and devices.

Online portals are unique custom websites that have login access to a back end where a consumer can log in access their account and upload documents. They require the receiver of the documents to initiate an account and or have the sender set up or complete an account, and have a login with a pin, password and or other to access the account. These tools require the sender and receiver to both be authenticated because there is a two-way exchange of sensitive data. Some companies provide apps that can be downloaded and installed where the sender can access the software, but they must set up an account, login and learn to use some piece of software they have never used before or previously did not have on their phone or computer.

There are tools that create widgets and links to collect data (web forms) where a sender can fill out an online application via entering data into fields and even attaching documents and hitting "complete" and data and documents are sent to a system or even sometimes emailed to another person. These solutions are not always secure and do not always encrypt documents. These solutions are always initiated by the sender and are not unique to the specific sender so anyone that comes across the URL/website where this link and or web form is can access the same page and upload any documents they want. The link is not unique to the specific user or request. These are multiuse pages and links. Since these are ALWAYS open and the receiver does not know the purpose for the request as it was not initiated by the receiver; when the data and documents are received the recipient may not know for what purpose the sender was sending for. These solutions are typically the victim of 'spam' since any sender (multiple senders over time) can find and access the exact same URL/website link. The links are not unique to the sender. Moreover, these links are just for documents and even if they stay open they do not create the ability for the documents to be encrypted in transit and/or at rest when they are saved.

Cyber security threats are increasing and so are Cyber security budgets to combat these threats. Companies continue to build large, strong impenetrable fortresses around their data and secure portals to protect access to their data. However, this protection comes at a cost, the true cost is the loss of convenience and this increase in security is making business harder with customers and clients. As security measures have increased over time convenience has decreased. Many businesses have realized this and have decreased security requirements, giving into risk, but increasing convenience factors. There exists a need for a means by which to send and receive data that is both secure and convenient and one which consumers, at the thought of exchanging secure data, embrace rather than cringe. A solution must encrypt data while traveling in an encrypted tunnel (secure transit), Encrypt data while at rest or when it is saved in another location, it must have a single touch point or single chain of custody between sender and receiver, a receiver must be able to initiate a request for data, the requestor must have the ability to send the request to a phone number via a text and/or an email or other means of communication etc., the request must assist the sender in creating a new document or create data using a phone camera of similar device, the process must not impose a new cost or new tool on the sender, new device, new account or cause a new application to be used by the sender, to send a file to the requestor no pin or password should be required, the communication portal must have a one-time use specific to a specific user and specific request so it cannot be hacked or accessed by a third party or the sender after the request is fulfilled, and the sender of the data does not have to be authenticated in the traditional sense because the requester is initiating a 'disposable' one way request to which there is no residual trail or creation of additional copies of the data that is being sent.

These and other improvements to the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY

Data (encrypted or not) travels in an encrypted tunnel (secure transit), with a single touch point or single chain of custody between sender and receiver wherein the receiver can initiate the request, not impose a new cost or new tool, device, account or application on the sender, and wherein the communication portal is a one-time use specific to a specified user and precise request. Throughout the process authentication of the sender of the data is not required because the requester is initiating a one-time 'disposable' request for a specific purpose.

In one embodiment of the present invention a method for single point of custody transfer of data includes initiating a request for data by a data requesting party wherein the sending party is associated with a unique identifier. The process continues by creating, by the requesting party, a secure data container (location for the data to be placed). The secure data container is next associated with the unique identifier. Using a communication means such as SMS, Email or the like the secure data container (or path to the secure data container location via a port address or URL) is delivered to a data sending party, e.g. the party which possesses the data subject of the request. Upon receipt of the data container location the sending party selects the data to be transferred, the data travels to the requesting party (data may or may not be encrypted). The data then travels to the secure data container location. The tunnel is a one-way (unidirectional) path. The sender cannot retrieve data once it is selected and sent. Once the data is received by the requesting party the data can be encrypted (if not previously encrypted). Once the sender sends the data, the sender is able to finish and close out the request. The request is then marked closed an cannot be reused (single/disposable use).

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 1A and FIG. 1B, collectively FIG. 1, is a flowchart of one method embodiment of the present invention for single point of custody process of secure data exchange;

FIG. 2A and FIG. 2B, collectively FIG. 2, shows flowchart of methodology for single point of custody secure data exchange among a requesting entity and a sending entity according to the present invention;

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A simple and convenient means by which to send and receive encrypted data is hereafter described by way of example. Sending secure data or information has historically required a tradeoff between security and convenience. The more secure the lest convenient and the more convenient the less secure. The present invention changes the existing paradigm by making the secure exchange of data simple and convenient. Traditional secure data exchange forces both parties (sender and receiver) to be using the same system, typically a portal or similar software, this is what is called a "sharing" event. With the present invention 1) data can be securely transported with only one party using the present invention software (having an account), and 2) now data can be transported in and out of secure online portals without these portals having the need for logins (logins being a sharing environment), this is what is called a "sending" event.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

The ability to send documents or data securely historically involves a multi-step process in which the identity of both parties is authenticated; special programs are downloaded and installed at both ends of the communication path; and a secure gateway, or "portal", is established to send and receive encrypted data. The process is tedious and time-consuming and, for many members of society, so complex they simply cannot or choose not to use it. Yet the need to send sensitive information from one location to another remains.

The Internet has enabled quick and convenient transfer of information, but using unencrypted internet paths carries the risk that sensitive data may fall into the wrong hands. One of reasonable skill in the relevant art will recognize that multiple techniques exist by which data can be effectively and securely transferred from one location to another using the Internet. But current processes are tedious, complex and time-consuming. The present invention maintains the ability to transfer data securely yet painlessly.

According to one embodiment of the present invention, data (encrypted or not) travels with a single touch point or single chain of custody between a sender and a receiver. The initiation of a data request by the receiver does not impose a burden or require the sender to use a new tool, device, account or application; rather, the secure communication portal is a one-time, single-use-specific gateway between two specified points using a single touch chain of custody. Traditional Authentication of the sender is not required, because the receiver transmits a one time "disposable" request directly targeted to the sender (also referred to herein as a client), and for a specific purpose.

Figure 1A:
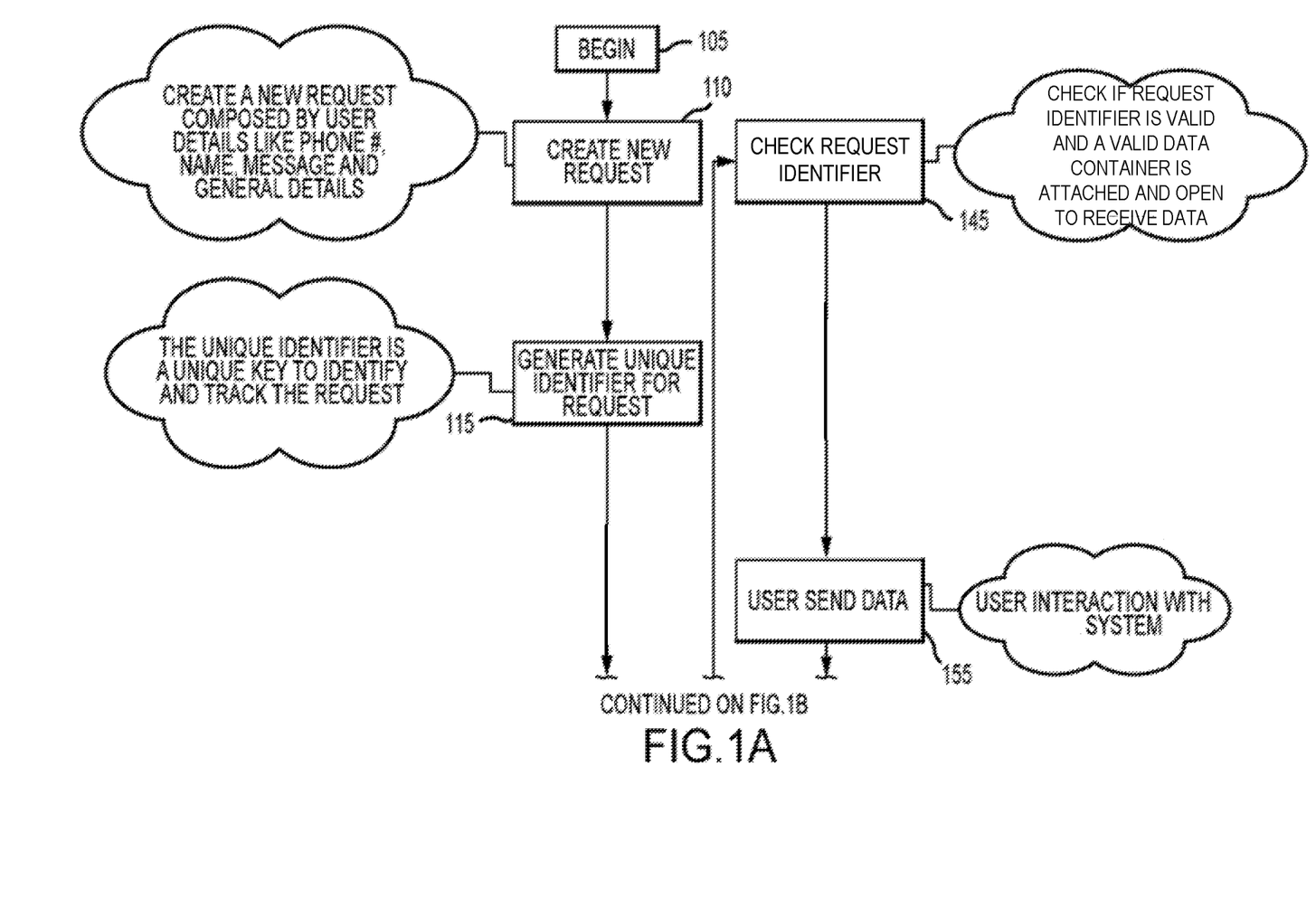
Figure 1B:
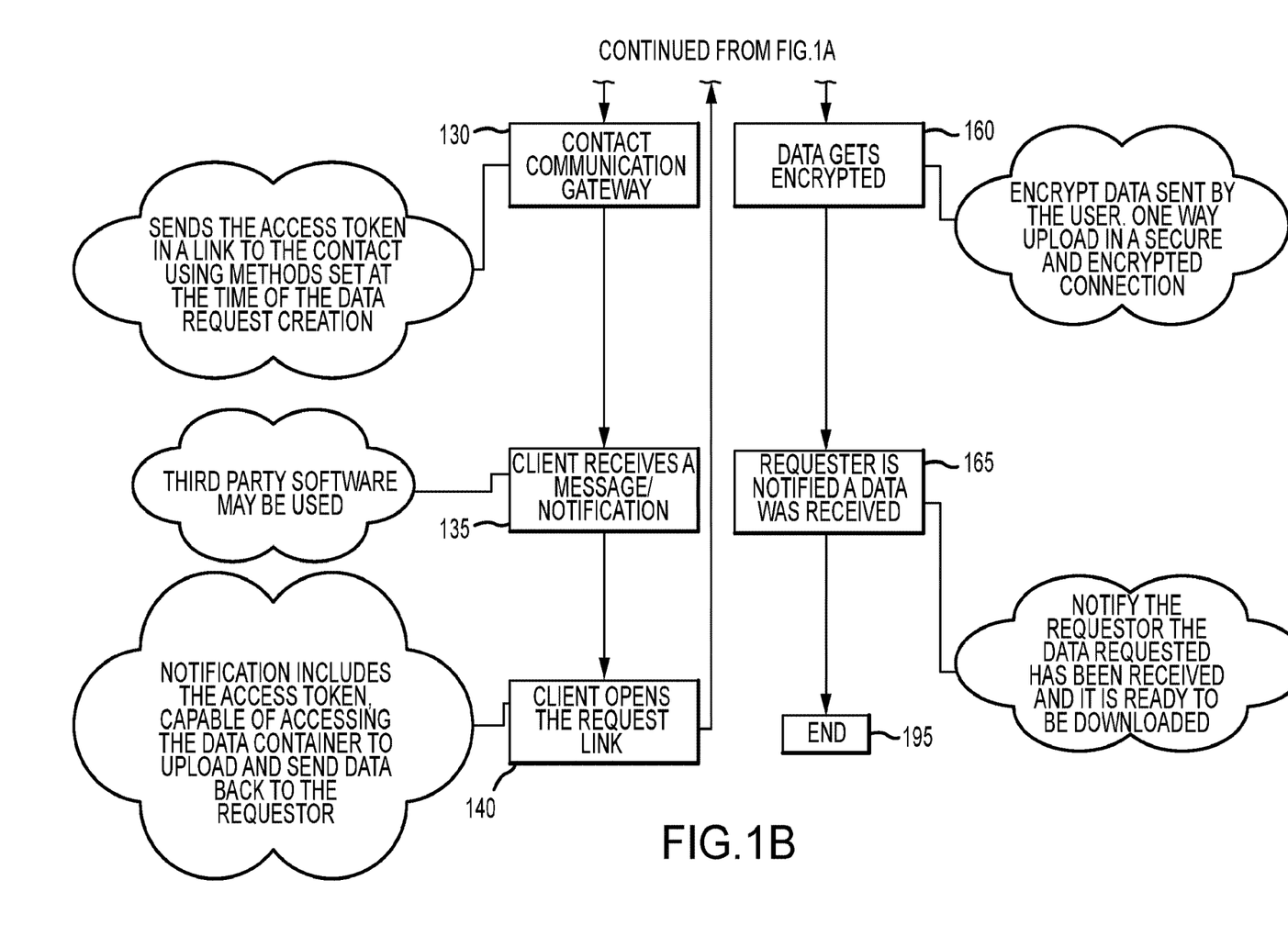

According to another embodiment, and referencing FIG. 1, the process begins 105 by the creation 110 of a new request for data by a requesting party (the "receiver"). The request can include information about the data sender ("sender") such as contact information (phone number, email address, name, etc.), and any other information the receiver wishes to include. Once the request for specific data is formed, a unique identifier "request identifier" 115 is generated and paired with the request. This process creates a secure data "container" for the sender's data. In another embodiment of the present invention the secure data container is a location at which data can reside. The request provides a path unique to the data requestor and the data sender by which data can be passed from the data sender to the data requester. The path is unidirectional and is not, in the embodiment a sharing of data. Rather, the sender is merely responsive to the request for data and the portal provides a means to deliver same.

Turning back to the prior embodiment, identifying information associated with the request, such as the sender's name, phone number and and linked to the request. The request identifier uniquely links the data container to both the receiver and the sender, and is sent via a Short Message Service (SMS) 130 gateway, email, as an example, or other communication platforms or means from the data receiver (i.e., the requestor of the data) to the data sender. As one of reasonable skill in the relevant art will appreciate, the use of the terms receiver and sender and not intended to limit the scope of the invention in any manner. Indeed, the receiver and/or the sender could be human or machine based and the exchange of data is applicable to any type of data communication system.

In the interest of clarity, SMS is a text messaging feature available on most telephone, World Wide Web, and mobile telephony systems and can be used in connection with the present invention. It uses standardized communication protocols to enable mobile phone devices to exchange short text messages. An intermediary service can also facilitate text-to-voice conversion. Roughly six billion people—or about 84% of the world's population—use SMS messaging, making it the most widely used data application, world-wide.

Once the sender receives 135 the data container (i.e., the URL link that is associated with the request identifier) via third-party messaging or software—such as an email client, instant-messaging, SMS, similar texting system and the like—the sender accesses (opens) 140 a software "link" (the link establishes a unidirectional, onetime use portal to a location for the secure storage of data.) to establish a secure connection and the request identifier is examined 145 by the receiver (or more accurately, the receiver's authentication software) to verify its authenticity. Once the receiver's system verifies the request identifier as authentic, a connection is established between both parties (receiver and sender). Generally, the sender has a relationship or is known to each other with the receiver and is expecting the request. While the requestor of data has access to the secure storage site, the link itself does not form a connection between the requestor and the sender but rather to an intermediary storage location.

With the request identifier validated by the receiver, the sender can then view the description details of what data is being requested. The sender then completes the request by selecting the actual data that was requested. The data is thereafter sent at 155 to the site (secure data location) for the requestor. Note also that the sender has not been required to download or install any new software, supply a password or pin, or take any additional steps to establish the sender's identity. With the secure Internet connection established, the sender can quickly and efficiently send documents and other data to the receiver.

In other embodiments of the present invention, the sender can send a picture of a document rather than the document itself. The sender simply uploads the documents, pictures, or other files to the secure connection by sending them through this request.

Once any data or data package "file" has been received into the data container it is, in one embodiment of the invention, can encrypted immediately if not previously encrypted 160. After each package of data "file" is completely sent the container does not allow the sender access to the data. The sender can instruct that the data be deleted or removed but cannot view/access the uploaded data and once the secure portal is closed the sender has no further ability to remove already uploaded data. This is a "one way" path or portal system or uni-directional. The sender can send as many packages or "files" that is needed, per the request. Once the sender has uploaded all of the pertinent data packages and/or data the sender completes the request by selecting a function to finish the request that closes the request container/portal. Once the container link/port is closed and the request completed, the link specific to this request is no longer accessible for data flow (sending or receiving). No more data can flow between the sender or receiver or to a data storage location via this unique request associated with the link/port. If more data is needed to be sent between sender and receiver a new request would have to be initiated with a new unique identifier 110.

Upon arrival 165 of the encrypted data container at the receiver's location, or as in another embodiment, arrival of data at a secure storage location, once authenticated the receiver can access the data and, if necessary, have it decrypted or sent to a different storage location as defined by the receiver.

The flowcharts including in the description depict examples of the methodology which may be used to securely transport data using a single chain of custody system. In this description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for exchanging data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Figure 2A:
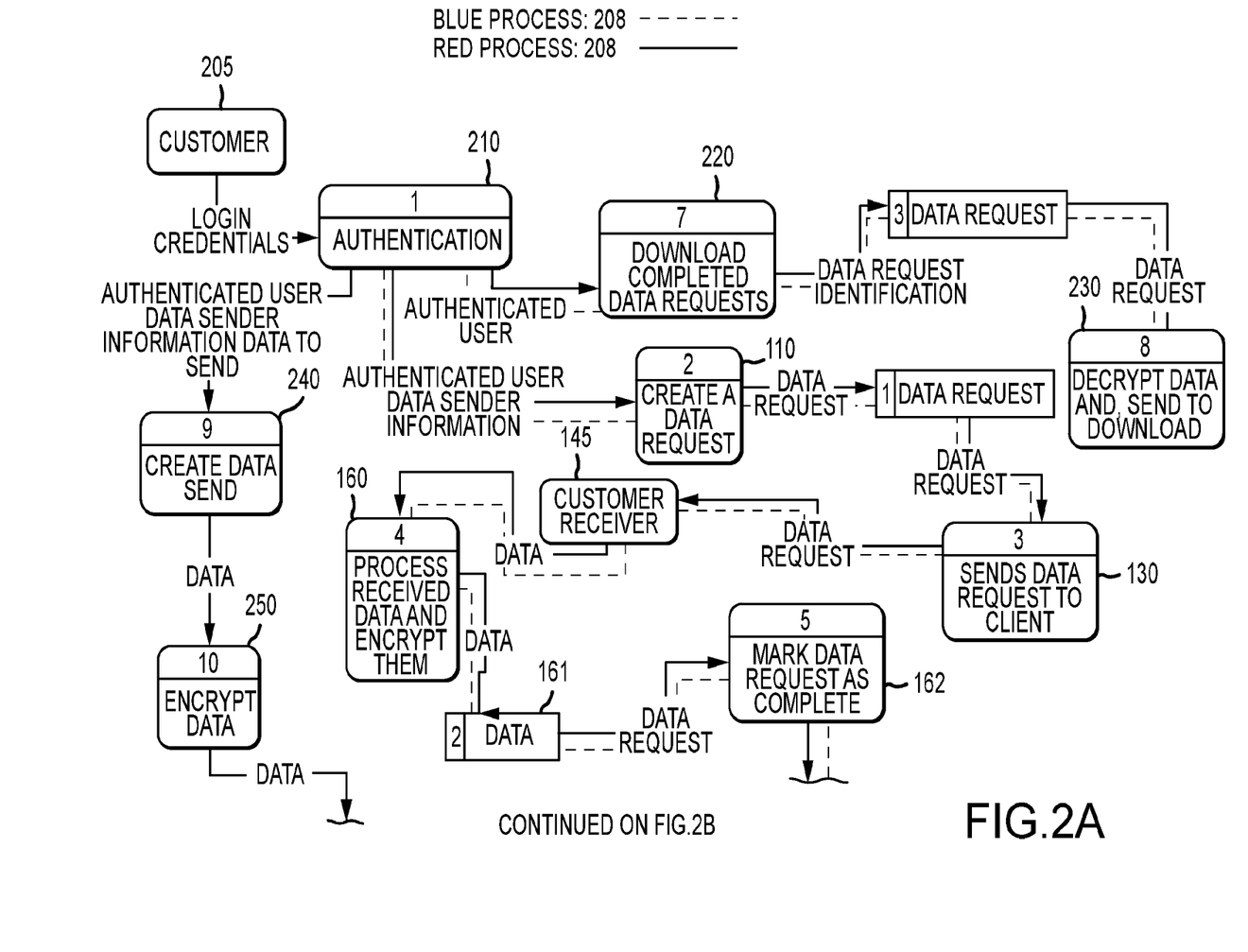
Figure 2B:
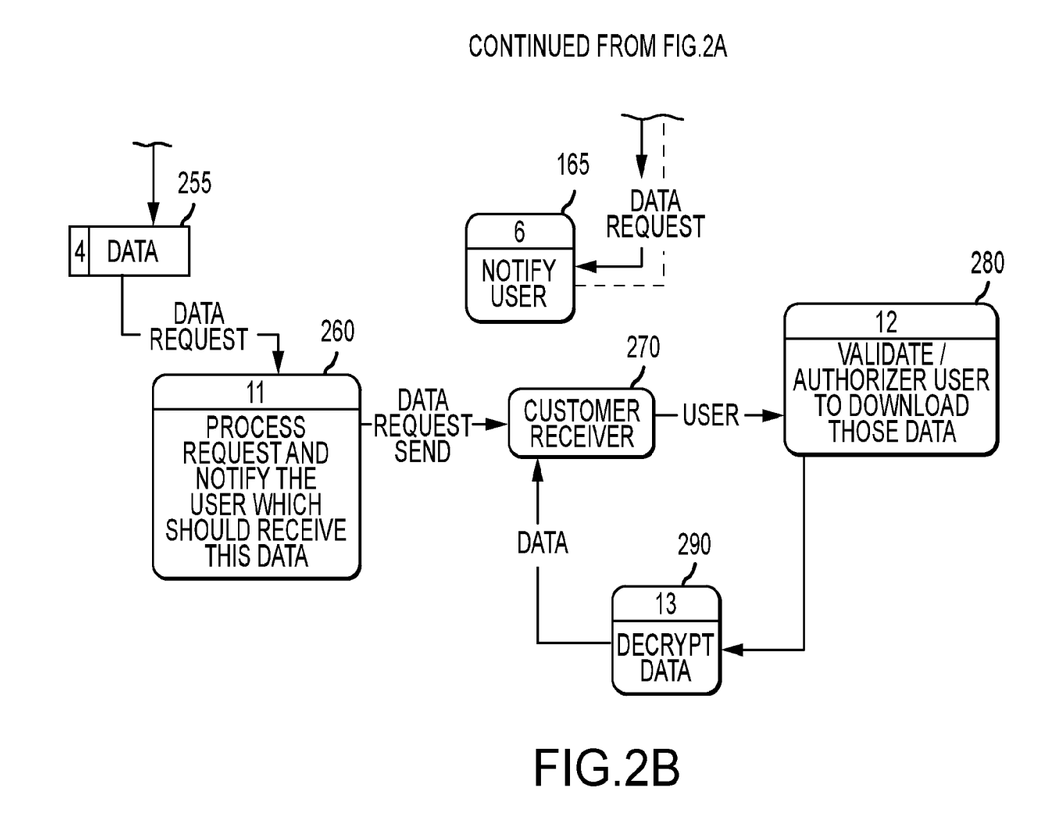

FIG. 2 presents flowcharts depicting the methodology for a single point of custody data exchange between two parties according to one embodiment of the present invention. The process begins 205 with the authentication 210 of the customer using the single chain of custody system. In a requesting role 208, the customer creates a document request 110 that is associated with a unique identifier. In one embodiment the request and the unique identifier form a secure data container. The data container, in this embodiment, is a link to a location at which data can be securely sent and stored. For example, the data location can be a storage location at dedicated server or a cloud-based storage location that is accessible by the data sender by a secure portal. The request and the data container are sent to a client 130 who receives the request, accesses the data container, sends data 161 to the data container as requested, via a unidirectional flow 160 and closes the link/port to the container. The closing of the container 162 completes the process. The storage location servers as an intermediary that holds the data, securely and in some instances in an encrypted state, until the data requestor, who is also associated with the unique identifier, retrieves the data.

As each container or storage location is associated with a unique identifier that is singularly associated with the data requestor, the inclusion of data results in a notification to the requestor that new data is ready for retrieval. The requesting entity, once authenticated 210, is presented with completed data requests. One or more of the completed data requests can be selected and, when necessary, decrypted 230

Similarly, the present invention can also be used to send data using a single point of custody system. A possessor of data is first authenticated 210 and can thereafter create 240 a secure data container by which to deliver data. The data container represents a path by which data from the possessor can be placed in a secure location that is later retrieved by the intended recipient. The intended recipient is notified 270 of the upcoming transfer of data and is validated 280 as the entity to which the documents are directed. Upon validation that the receiving party is indeed the intended recipient, the data can be retrieved and decrypted 290, if needed.

The data container, which is associated with a unique identifier by a requesting entity, represents a location in one embodiment. A link to the container, and a request to send data to the container, are combined into a message which is sent to a client. Upon receipt of the message and the request for data, the client need not do anything to create a secure environment by which to secure and transfer the data. The secure environment is already created using a secure unidirectional one-time use portal to the data storage location that is merely awaiting data; data supplied by the client. Once the client places the requested data into the data portal and ultimately to arrive at the container, the container closes. The container, now closed and containing data, is available to the original requesting entity.

Figure 3:
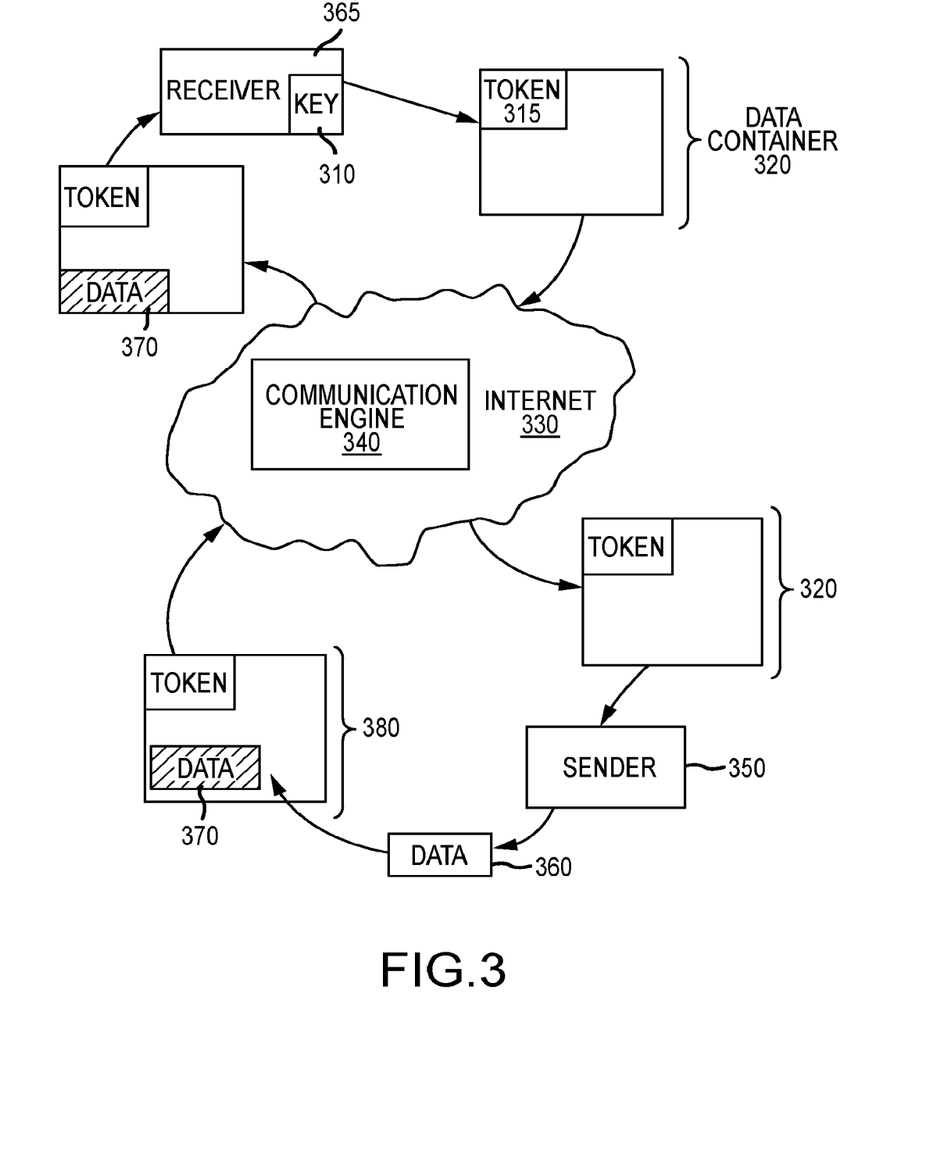
FIG. 3 is a high-level system diagram for a single point custody secure data exchange according to one embodiment of the present invention.

FIG. 3 presents a high-level depiction of a system for single point of custody exchange of data. According to one embodiment of the present invention, a receiver (requestor of data) 305 crafts a request for and seeks data 360 from a sender 350. The receiver 305 possesses, in one embodiment, unique identifier 310 that is unique and solely possessed by the receiver. The request forms a data container, or data storage location, 320 that is uniquely associated with a unique identifier 315 as described herein. In an embodiment, data container 320 is the ultimate data location. Using the Internet or an Intranet 330 and a communication engine a means to access the data container 320 is delivered to the sender 350. The sender 350 sends data 360 per the request via a portal which is a unidirectional flow and when placed within the data container 320 forming a secure data container 380 with the data that was sent. Notice that the secure data container 380 includes the requested information is returned to the receiver whereupon the requester can retrieve the data 370.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 4:
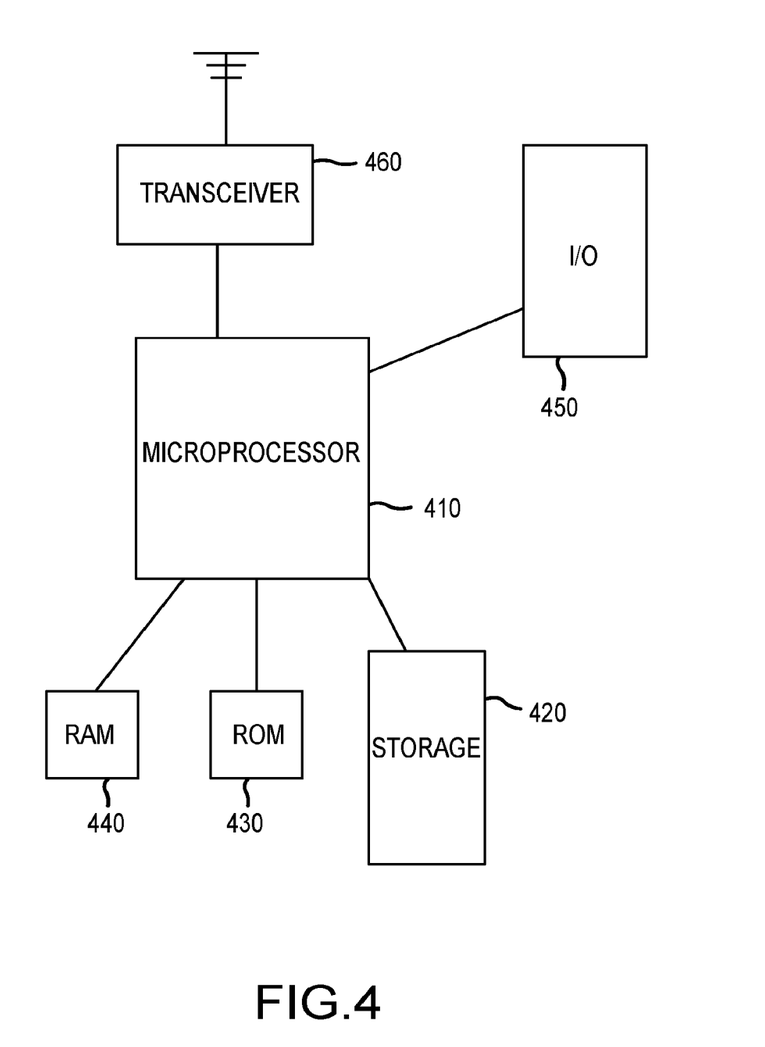
FIG. 4 is a high-level diagram of a computing system as may be used to implement one or more embodiments of the present invention.

An exemplary system for implementing the invention includes a general-purpose computing device such as the form of a conventional personal computer, a personal communication device or the like, including a processing unit, a system memory, and a system bus that joins various system components, including the system memory 420 to the processing unit (microprocessor) 410. The system bus may be any of several types of bus structures including a memory bus or memory controller, a peripheral bus, and a local bus using any of a variety of bus architectures. The system memory generally includes read-only memory (ROM) 430 and random-access memory (RAM) 440. A basic input/output 450 system (BIOS), containing the basic routines that help to transfer information between elements within the personal computer, such as during start-up, is stored in ROM. The personal computer may further include persistent storage media 420 such as a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. The system may further include a transceiver 460 or similar device to enable communication (wireless or otherwise) with other devices. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for single point of custody transfer of data, comprising:
   initiating a request for data by a data requesting party, wherein the request identifies a data sending party;
   establishing a location for a secure storage of data;
   associating the data requesting party, the request, and the location with a unique identifier;
   delivering the request for data to the data sending party, the request establishing a single use unidirectional secure portal to the location for the secure storage of the data associated with the unique identifier, and wherein the single use unidirectional secure portal is unidirectional as from the data sending party;

verifying, by the data requesting party, authenticity of the unique identifier used to establish the single use unidirectional secure portal, wherein the data sending party is responsive to the authenticity of the unique identifier having been verified to place the data within the location for the secure storage of data via the single use unidirectional secure portal, and wherein the data sending party closes the single use unidirectional secure portal after the data has been placed in the location for the secure storage of the data associated with the unique identifier; and responsive to the single use unidirectional secure portal being closed, notifying the data requesting party that data has been placed in the location for the secure storage of data associated with the unique identifier.

2. The method for single point of custody transfer of data according to claim 1, wherein the request includes a link which establishes the single use unidirectional secure portal.

3. The method for single point of custody transfer of data according to claim 2, wherein the link is configured to establish the single use unidirectional secure portal between the link and the data sending party and wherein the single use unidirectional secure portal is configured to transfer data from the data sender to the location.

4. The method for single point of custody transfer of data according to claim 1, wherein the location for the secure storage of data is established by initiating the request for data.

5. The method for single point of custody transfer of data according to claim 1, wherein the location for the secure storage of data is a cloud-based data storage medium.

6. The method for single point of custody transfer of data according to claim 1, wherein the unique identifier is a single use unique identifier.

7. A computer-readable non-transitory storage medium tangibly embodying a program of instructions executable by a machine wherein said program of instruction comprises a plurality of program codes for single point of custody transfer of data, said program of instruction comprising:

program code for initiating a request for data from a data requesting party, wherein the request identifies a data sending party;

program code for establishing a location for a secure storage of data;

program code for associating the data requesting party, the request, and the location with a unique identifier;

program code for delivering the request for data to the data sending party, wherein the request establishes a single use unidirectional secure portal to the location for the secure storage of the data associated with the unique identifier, and wherein the single use unidirectional secure portal is unidirectional as from the data sending party;

program code for verifying, by the data requesting party, authenticity of the unique identifier used to establish the single use unidirectional secure portal, wherein the data sending party is responsive to the authenticity of the unique identifier having been verified to place the data within the location for the secure storage of data via the single use unidirectional secure portal, and wherein the data sending party closes the single use unidirectional secure portal after the data has been placed in the location for the secure storage of the data associated with the unique identifier; and program code for notifying, in response to the single use unidirectional secure portal being closed, the data requesting party that data has been placed in the location for the secure storage of data associated with the unique identifier.

8. The computer-readable non-transitory storage medium tangibly embodying a program of instructions of claim 7, wherein the program code for initiating the request for data creates a link to establish the single use unidirectional secure portal to the location.

9. The computer-readable non-transitory storage medium tangibly embodying a program of instructions of claim 8, further comprising program code to establish the single use unidirectional secure portal between the data requesting party and the data sending party and wherein the single use unidirectional secure portal is configured to accept data from the data sending party.

10. The computer-readable non-transitory storage medium tangibly embodying a program of instructions of claim 7, further comprising program code, responsive to data being placed within the location for the secure storage of data by the data sending party.

11. A method for single point of custody transfer of data, comprising:

receiving, by a data sending party, a request for data, wherein the request is initiated by a data requesting party and the request identifies a data sending party, and wherein the data requesting party, the request, and a location for a secure storage of data are associated with a unique identifier, wherein the request establishes a single use unidirectional secure portal to the location for the secure storage of the data associated with the unique identifier;

obtaining, by the data sending party, the location for the secure storage of data wherein the location is established by the data requesting party, wherein the single use unidirectional secure portal is unidirectional as from the data sending party, and wherein data requesting party verifies the unique identifier authenticity;

responsive to the authenticity of the unique identifier having been verified, placing, by the data sending party, data within the location for the secure storage of data via the single use unidirectional secure portal;

responsive to placing data within the location, closing the single use unidirectional secure portal; and responsive to the single use unidirectional secure portal being closed, notifying the data requesting party that data has been placed in the location for the secure storage of data associated with the unique identifier.

12. The method for single point of custody transfer of data according to claim 11, wherein responsive to placing data within the location for the secure storage of data via the single use unidirectional secure portal.

13. The method for single point of custody transfer of data according to claim 11, further comprising receiving, by the data sending party, the location via a link of a third-party messaging software.

* * * * *